April 9, 1940.  C. SAURER  2,196,428
RESILIENT MOUNTING
Filed Oct. 11, 1933  3 Sheets-Sheet 1
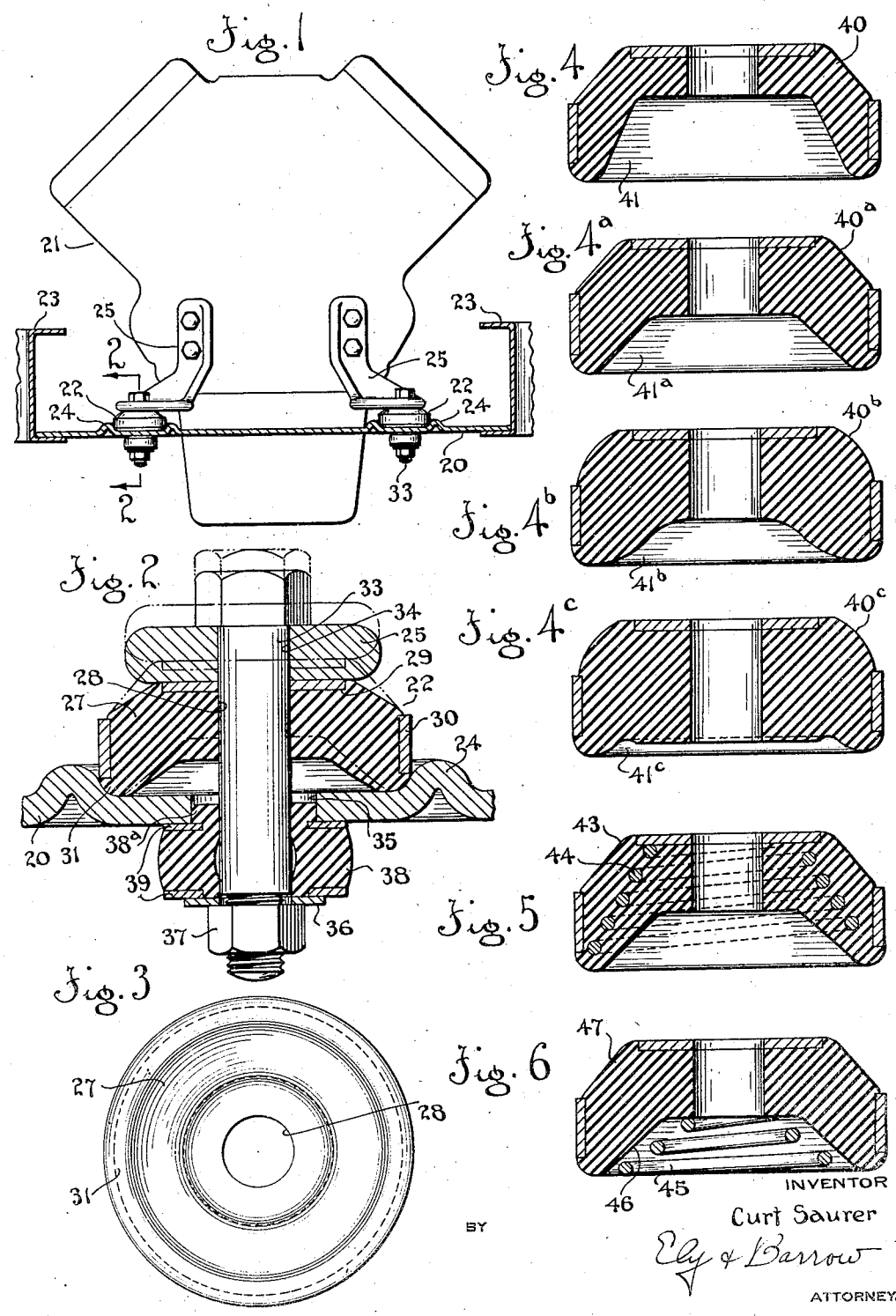
INVENTOR
Curt Saurer
BY Ely & Barrow
ATTORNEYS April 9, 1940.　　　　C. SAURER　　　　2,196,428
RESILIENT MOUNTING
Filed Oct. 11, 1933　　　3 Sheets-Sheet 2
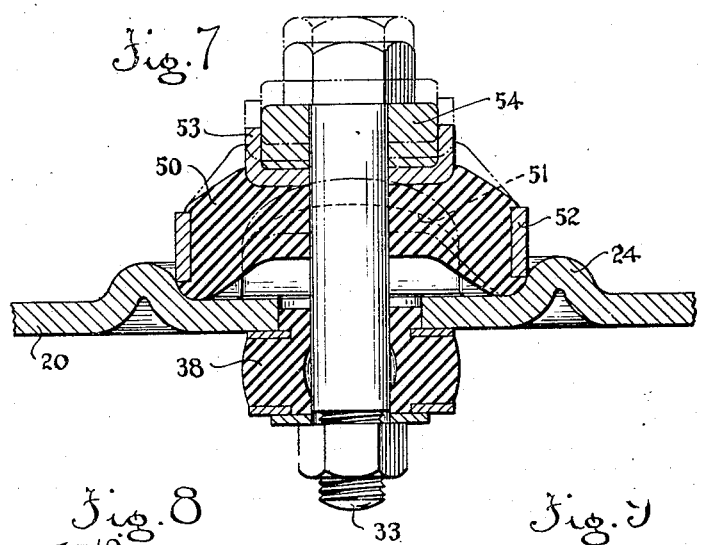
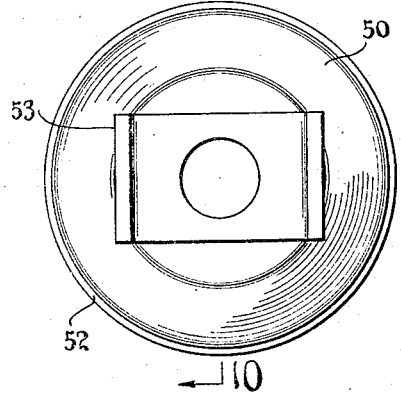
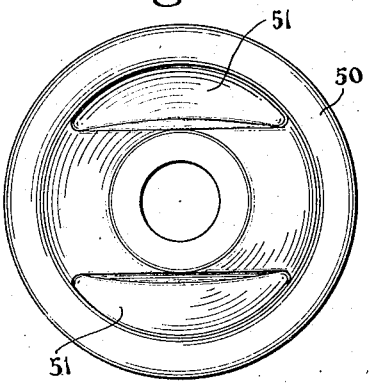
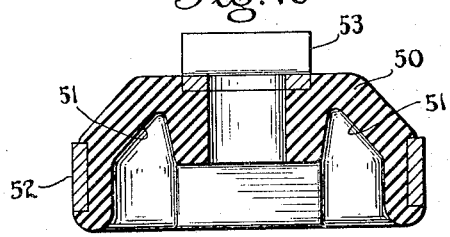
INVENTOR
Curt Saurer
BY
Ely & Barrow
ATTORNEYS

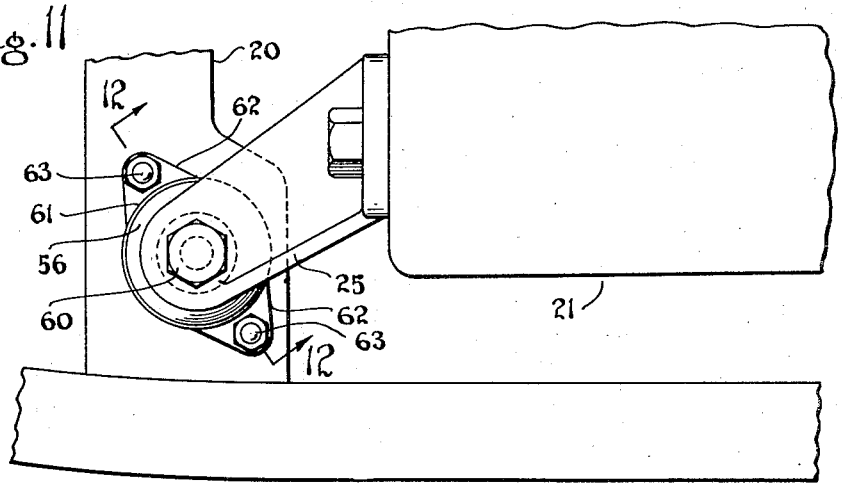
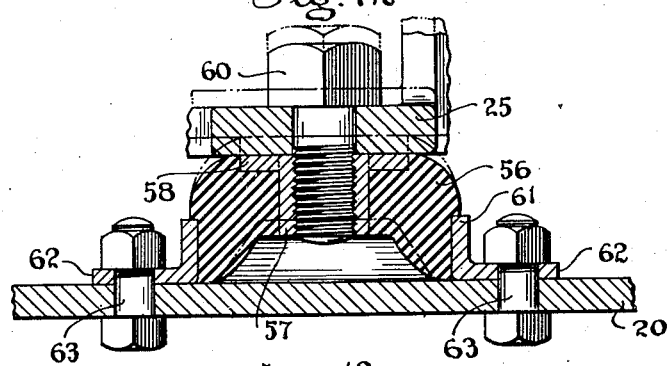
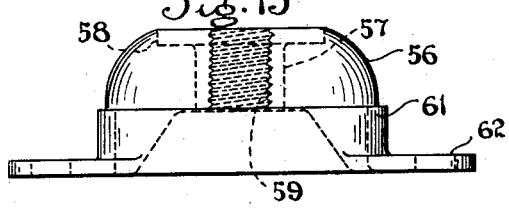
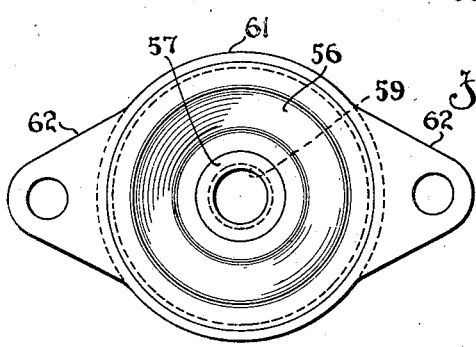

Patented Apr. 9, 1940

2,196,428

UNITED STATES PATENT OFFICE 2,196,428

RESILIENT MOUNTING

Curt Saurer, Akron, Ohio, assignor to The Firestone Tire & Rubber Company, Akron, Ohio, a corporation of Ohio Application October 11, 1933, Serial No. 693,102

12 Claims. (Cl. 248—358)

This invention relates to resilient mountings, and more especially it relates to yielding structures such as commonly are used between two relatively movable members to dampen the vibration of the movable member, and/or prevent the vibration thereof from being transmitted to the other member.

The invention is an improvement of the resilient mounting shown in my prior United States Patent No. 1,977,896, issued October 23, 1934.

The chief objects of the invention are to provide resilient mountings of the character mentioned that will operate in an improved manner as compared to the mountings of the above-noted application. More specifically, the invention aims to supplement the resistance to deformation of the rubber in the mounting by the resistance to compression of the air confined on the concave side of the mounting; to reinforce the rubber mounting with supplemental yielding means such as a spring; to provide a resilient mounting of greater resistance to lateral vibration in one direction than in another; to provide a single resilient member capable of yieldingly cushioning both bound and rebound; and to provide improved means for connecting a resilient mounting to a supporting and a supported member. Other objects will be manifest.

Of the accompanying drawings:

Figure 1 is a view of a typical installation comprising two of the improved resilient mountings, a supported member, and a supporting member, the latter being shown in section;

Figure 2 is a section on the line 2—2 of Figure 1;

Figure 3 is a bottom plan view of the resilient member shown in Figures 1 and 2;

Figures 4, 4a, 4b and 4c are diametric sectional views of a series of resilient mountings having varying degrees of resistance to deformation;

Figure 5 is a sectional view of a resilient mounting, constituting another embodiment of the invention;

Figure 6 is a sectional view of a resilient mounting constituting a modified form of the structure shown in Figure 5;

Figure 7 is a transverse sectional view of yet another embodiment of the invention in association with a supported and a supporting member;

Figure 8 is a top plan view of the resilient mounting shown in Figure 7;

Figure 9 is a bottom plan view thereof;

Figure 10 is a section on the line 10—10 of Figure 8;

Figure 11 is a plan view of still another embodiment of the resilient mounting in operative association with a supported and a supporting member;

Figure 12 is a section on the line 12—12 of Figure 11;

Figure 13 is a side elevation of the resilient mounting shown in Figure 11; and

Figure 14 is a bottom plan view thereof.

Referring now to Figures 1 to 3 of the drawings, 20 is a supporting member, and 21 is a member supported thereby at a number of points by resilient mountings, such as the resilient mounting structures generally designated 22, 22. As herein illustrated, the supported member 21 is a vibratory member; specifically it is the engine of a motor vehicle, and the supporting member 20 is a metal plate that is supported at its respective ends upon the side-rails 23, 23 of the vehicle frame. The supporting member 20 is formed with annular, raised ribs 24 defining seats for the resilient mountings 22, and the engine 21 preferably is provided with outwardly extending brackets or feet 25 by means of which it is attached to the resilient mounting and supporting member.

The resilient mounting 22 comprises a resilient member 27 consisting of an annular, dome-like, concavo-convex structure of resilient material such as rubber, said structure having an axial aperture 28, and having an annular wear plate or washer 29 molded into its convex or top face, concentrically thereof. The peripheral wall of the member 27 is defined by a tubular metal facing 30 that is vulcanized to the rubber structure. The rubber of the structure 27 extends beyond the margin of the metal facing on the concave side of the structure, and covers the lower marginal face of said facing as is clearly shown at 31. This projecting portion 31 of the member 27 is rounded, and fits snugly into the fillet or reentrant formed at the juncture of the inner periphery of the rib 24 with the plate 20.

The foot 25, resilient mounting 22 and plate 20 are secured together by a bolt 33 that extends through an aperture 34 in said foot, through the aperture 28 in the resilient member 27, and through a relatively large aperture 35 in the plate 20 at the axis of rib 24. Clamped between the lower face of plate 20 and a washer 36 and nut 37 on the lower end of bolt 33 is a thick, resilient rubber disc 38 that has its upper and lower faces provided with metal wear-plates 39, 39, and is formed with an axial boss 38a that extends into aperture 35 in plate 20. In Figure 2 the resilient member 27 is shown in full lines in a somewhat deformed condition due to the weight of the motor 21, its normal condition being shown in broken lines. The member 38 is somewhat more resilient than the member 27 and normally is deformed, as shown, by the tightening of nut 37 on bolt 33. The member 38 serves to cushion the rebound of the motor when the vehicle passes over rough roadways.

Figures 4 to 4c inclusive show resilient members 40, 40a, 40b and 40c for resilient mountings, said resilient members being dome-shaped and of the same general character as resilient member 27, but being of varying degrees of resilience and resistance to deformation due to different amounts of rubber in their respective structures. The members 40 to 40c have the same overall dimensions as the member 27 so as to be interchangeable with the latter and with each other, the concavities 41, 41a, 41b and 41c on the under sides of the members being of different volumetric capacities to compensate for the different amounts of rubber in the members. The arrangement is such that the resilient members 27 and 40 to 40c inclusive may be used alternatively to provide the degree of resilience required for a particular installation.

In Figures 5 and 6 are shown resilient mountings in which the resistance to deformation of the rubber structure is supplemented by compression springs. These embodiments of the invention are of utility in heavy installations where the resilient members heretofore described are not large enough to provide the required resistance to deformation together with the amplitude of movement desired. The structure shown in Figure 5 comprises a resilient rubber member 43 having a coiled wire compression spring 44 molded into its structure. In Figure 6 a coiled compression spring 45 is mounted in the cavity 46 on the under side of the resilient rubber structure 47.

The resilient mounting shown in Figures 7 to 10 is designed to provide greater resistance to lateral or radial vibration in one direction than in another. It comprises a body portion 50 of resilient rubber composition, which body portion 50 is of the same general dome-like shape as the previously described embodiments of the invention, but has its concave under side formed with a pair of elongate, parallel, diametrically opposed recesses 51, 51. The member 50 is provided with the usual peripheral metal facing 52, and has a U-shaped metal bracket 53 molded into and vulcanized to its upper or convex surface, the said bracket being determinately angularly disposed with relation to the recesses 51. The bracket 53 is shaped to embrace the foot 54 of a vehicle-motor support, the arrangement being such that when the vehicle motor and resilient mounting are assembled on a supporting plate, the resilient mounting will have greatest resistance to lateral vibration in the direction of the axis or crank shaft of the motor, and have least resistance to vibration in a direction transversely thereof. Thus the bracket 53 assures that the resilient mounting always will be disposed in the proper angular relation to the vehicle motor, whereby lateral vibration of the engine is damped and suppressed by the resilient mounting, and axial movement of the engine with relation to the vehicle frame, such as occurs during starting and braking of the vehicle, is strongly resisted.

In the embodiment of the invention shown in Figures 11 to 14 inclusive, there is provided a dome-like, concavo-convex, resilient mounting 56 that has molded and vulcanized therein an axial metal bushing 57 that extends completely through the rubber structure. At its upper end the metal bushing 57 is formed with an integral flange or collar 58 that is flush with the top of the resilient member 56, and said bushing is formed axially with female screw threads 59 to receive a bolt 60 by means of which a supporting foot 25 of the vehicle engine 21 is secured to the resilient mounting. The resilient member 56 is provided with a peripheral metal facing 61 that has a pair of integral, outwardly extending, apertured ears 62, 62 extending from diametrically opposite points of its lower margin, said ears being adapted to receive respective bolts 63 by which the mounting is attached to cross member 20 of the vehicle frame. The rubber of the member 56 extends flush with the plane of the lower surface of ears 62 and facing 61 and thus is in contact with cross-plate 20 so as to confine air within the cavity on the under side of said resilient member. In this embodiment of the invention the single resilient member 56 serves to absorb both bound and rebound as well as lateral vibrations. The broken line position of the member 56 in Figure 12 is its normal, undeformed position. The full lines show it somewhat deformed by the weight of the engine 21.

The invention is simple and compact, and achieves the several advantages set out in the foregoing statement of objects. The feature of the rib 24 that circumscribes and closely engages the yielding portion 31 of the resilient mounting prevents sliding movement of the resilient mounting on the plate 20, thus assuring that all vibratory movement of the engine 21 will be absorbed in the said mounting.

Modification may be resorted to without departing from the spirit of the invention or the scope of the appended claims.

What is claimed is:

1. In a resilient mounting the combination of two spaced-apart, relatively movable members, an arched structure of resilient rubber having a circumscribing metal facing intermediate its respective ends, said structure being disposed between said members and adapted yieldingly to resist movement of one member toward the other by radial compression of the rubber, and means on one of the relatively movable members engaging the rubber portion of the resilient member so as yieldingly to resist lateral movement of the resilient member with relation to said relatively movable members.

2. In a resilient mounting, the combination of a supporting and a supported member, a resilient structure disposed between said members, said resilient structure comprising an annular dome-shaped rubber member having a metal facing about its periphery, the rubber projecting beyond and over one margin of said metal facing, and means on said supporting member engaging said projecting portion of the rubber structure for yieldingly resisting lateral movement of the resilient member with relation to said supporting member.

3. In a resilient mounting, the combination of a supported member, a supporting member formed with an annular rib defining a seat for a resilient mounting, and a resilient mounting disposed between said supporting and supported members, said mounting comprising an annular concavo-convex rubber structure having a tubular metal facing disposed locally on the periphery thereof, the rubber extending below said metal facing and engaging the supporting member and said annular rib.

4. A resilient mounting comprising a dome-shaped rubber structure having a metal facing about its periphery intermediate the ends of the structure, and a coiled compression spring disposed coaxially thereof and wholly within the boundaries of the said structure.

5. A resilient mounting comprising an annular, dome-shaped member of resilient rubber, an inextensible peripheral facing bonded thereto and limiting radial deformation of the rubber structure under load, and a coiled compression spring disposed concentrically of the mounting and molded into the rubber body thereof for supplementing the resistance of the rubber to an axially directed load.

6. In a resilient mounting, the combination of a supporting member, a supported member, an annular rubber structure disposed between said members and so constructed as to offer greater resistance to relative lateral movement of said members in one direction than in another, and means bonded to said rubber structure for mounting it in determinate angular position with relation to said structures, said means being non-symmetrical and arranged in determinate position with relation to the differential resistance characteristics of the rubber structure.

7. In a resilient mounting, the combination of a supporting member and a supported member, the latter being movable, a resilient mounting between said members, said mounting comprising an annular concavo-convex rubber structure that is stiffer in one diametric plane than in a plane normal thereto, and a non-symmetrical fixture bonded to the convex side of the rubber structure adapted to engage the supported member, said fixture being determinately angularly disposed with relation to the planes of differential stiffness of the resilient member.

8. In a resilient mounting, the combination of a supporting and a supported member, and a resilient mounting therebetween, said mounting comprising an annular, concavo-convex structure of resilient rubber, and an inextensible peripheral facing of metal bonded thereto, said facing having a pair of apertured ears extending outwardly from one margin thereof for attachment to the supporting member, the rubber on the concave side of the structure extending to the plane of the lower face of said ears to seal the concavity in the structure when it is in operative position.

9. In a support, a rigid supporting side wall, a flexible rubber part bonded to the wall and projecting therefrom in load carrying relation thereto, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by the rubber in shear, the rubber at the recessed end extending over the edge of the supporting wall forming a cushion support for the supporting wall.

10. In a support, a rigid supporting side wall, a flexible rubber part bonded to the wall and projecting therefrom in load carrying relation thereto, and disposed a substantial distance from an end of the supporting wall forming a recess providing for movement of the rubber part toward the offset free edge of the side wall, and means receiving a load carried by the rubber part, said support being so constructed and arranged that at least the major portion of the normal load thrust on the rubber part is carried by the rubber in shear, the rubber at the recessed end extending over the edge of the supporting wall forming a cushion support for the supporting wall.

11. In a resilient mounting, the combination with a supporting and a supported member, of a resilient rubber structure disposed between said members, said resilient structure being annular and formed with a recess in one end thereof, a metal facing about the periphery of the resilient structure intermediate the ends thereof, the rubber at the recessed end of the structure extending over the edge of the metal facing for engagement with one of the members between which the mounting is positioned, and means for attaching the mounting to the supporting and supported structures such that the recess in the end of the mounting is closed and constitutes a pneumatic cushion that supplements the rubber of the structure in supporting the load on the mounting.

12. In a resilient cushioning device, the combination of a resilient dome-shaped rubber structure having a concave recess opposite the dome of said rubber structure to permit axial movement of said rubber structure, and inextensible means surrounding said rubber structure substantially throughout the axial extent of said recess whereby when said rubber structure is deformed in the direction of concavity of said recess the rubber is subjected substantially to radial compression.

CURT SAURER.